US00RE45085E

(19) United States
(12) Reissued Patent
Bookman et al.

(10) Patent Number: US RE45,085 E
(45) Date of Reissued Patent: Aug. 19, 2014

(54) SYSTEM AND METHOD FOR LINKING STREAMS OF MULTIMEDIA DATA TO REFERENCE MATERIAL FOR DISPLAY

(75) Inventors: Marc Bookman, Palo Alto, CA (US); Brian Yamanaka, Mountain View, CA (US)

(73) Assignee: Sentius International, LLC, McLean, VA (US)

(21) Appl. No.: 13/603,315

(22) Filed: Sep. 4, 2012

Related U.S. Patent Documents

Reissue of:
(64) Patent No.: 5,822,720
Issued: Oct. 13, 1998
Appl. No.: 08/676,890
Filed: Jul. 8, 1996

U.S. Applications:
(63) Continuation of application No. 12/480,556, filed on Jun. 8, 2009, now Pat. No. Re. 43,633, which is a continuation of application No. 11/064,519, filed on Feb. 24, 2005, now Pat. No. Re. 40,731, which is an application for the reissue of Pat. No. 5,822,720, which is a continuation of application No. 08/197,157, filed on Feb. 16, 1994, now abandoned.

(51) Int. Cl.
*G06F 17/30* (2006.01)
*G06F 17/28* (2006.01)

(52) U.S. Cl.
USPC ..... 704/3; 704/1; 704/9; 704/10; 707/706; 707/707; 707/708; 707/758; 707/999.003; 715/255; 715/856; 345/157; 345/160

(58) Field of Classification Search
USPC ..... 707/706–708, 758, 999, 3; 704/1, 9, 10, 704/3; 715/255, 856; 345/157, 160
See application file for complete search history.

(56) References Cited

U.S. PATENT DOCUMENTS 3,872,448 A 3/1975 Mitchell, Jr.
4,136,395 A 1/1979 Kolpek et al.

(Continued)

FOREIGN PATENT DOCUMENTS

EP 0 093 250 A2 11/1983
EP 0 840 240 A2 5/1998

(Continued)

OTHER PUBLICATIONS

Allen, "Introduction to Natural Language Understanding", Natural Language Understanding, Chapter 1, p. 1-19, The Benjamin/Cummings Publishing Company, Inc., 1988.

(Continued)

*Primary Examiner* — Lamont Spooner
(74) *Attorney, Agent, or Firm* — Wilmer Cutler Pickering Hale and Dorr LLP

(57) ABSTRACT

A system for indexing displayed elements that is useful for accessing and understanding new or difficult materials, in which a user highlights unknown words or characters or other displayed elements encountered while viewing displayed materials. In a language learning application, the system displays the meaning of a word in context; and the user may include the word in a personal vocabulary to build a database of words and phrases. In a Japanese language application, one or more Japanese language books are read on an electronic display. Readings ('yomi') for all words are readily viewable for any selected word or phrase, as well as an English reference to the selected word or phrase. Extensive notes are provided for difficult phrases and words not normally found in a dictionary. A unique indexing scheme allows word-by-word access to any of several external multi-media references.

19 Claims, 5 Drawing Sheets

(56) References Cited

U.S. PATENT DOCUMENTS 4,308,582 A 12/1981 Berger
4,318,184 A 3/1982 Millett et al.
4,384,288 A 5/1983 Walton
4,456,973 A 6/1984 Carlgren et al.
4,651,300 A 3/1987 Suzuki et al.
4,674,065 A 6/1987 Lange et al.
4,689,768 A 8/1987 Heard et al.
4,742,481 A 5/1988 Yoshimura
4,773,009 A 9/1988 Kucera et al.
4,774,666 A 9/1988 Miyao et al.
4,785,413 A 11/1988 Atsumi
4,811,197 A 3/1989 Wexler
4,817,050 A 3/1989 Komatsu et al.
4,837,797 A 6/1989 Freeny, Jr.
4,864,501 A 9/1989 Kucera et al.
4,868,743 A 9/1989 Nishio
4,868,750 A 9/1989 Kucera et al.
4,887,212 A 12/1989 Zamora et al.
4,893,270 A 1/1990 Beck et al.
4,913,566 A 4/1990 Sakai et al.
4,914,586 A 4/1990 Swinehart et al.
4,931,987 A 6/1990 Kawakami
4,945,476 A 7/1990 Bodick et al.
4,958,283 A 9/1990 Tawara et al.
4,980,855 A 12/1990 Kojima
4,982,344 A 1/1991 Jordan
4,994,966 A 2/1991 Hutchins
5,020,019 A 5/1991 Ogawa
5,065,315 A 11/1991 Garcia
5,088,052 A 2/1992 Spielman et al.
5,089,990 A 2/1992 Saito
5,128,865 A 7/1992 Sadler
5,146,439 A 9/1992 Jachmann et al.
5,146,552 A 9/1992 Cassorla et al.
5,151,857 A 9/1992 Matsui
5,157,606 A 10/1992 Nagashima
5,204,947 A 4/1993 Bernstein et al.
5,214,583 A 5/1993 Miike et al.
5,218,697 A 6/1993 Chung
5,222,160 A 6/1993 Sakai et al.
5,226,117 A 7/1993 Miklos
5,233,513 A 8/1993 Doyle
5,241,671 A 8/1993 Reed et al.
5,253,362 A 10/1993 Nolan et al.
5,256,067 A 10/1993 Gildea et al.
5,267,155 A 11/1993 Buchanan et al.
5,289,376 A 2/1994 Yokogawa
5,297,249 A 3/1994 Bernstein et al.
5,303,151 A 4/1994 Neumann
5,319,711 A 6/1994 Servi
5,329,446 A 7/1994 Kugimiya et al.
5,331,555 A 7/1994 Hashimoto et al.
5,337,233 A 8/1994 Hofert et al.
5,349,368 A 9/1994 Takeda et al.
5,351,190 A 9/1994 Kondo
5,361,202 A 11/1994 Doue
5,367,621 A 11/1994 Cohen et al.
5,375,200 A 12/1994 Dugan et al.
5,377,323 A 12/1994 Vasudevan
5,392,386 A 2/1995 Chalas
5,404,435 A 4/1995 Rosenbaum
5,404,506 A 4/1995 Fujisawa et al.
5,408,655 A 4/1995 Oren et al.
5,416,901 A 5/1995 Torres
5,418,942 A 5/1995 Krawchuk et al.
5,434,974 A 7/1995 Loucks et al.
5,438,655 A 8/1995 Richichi et al.
5,455,945 A 10/1995 VanderDrift
5,459,860 A 10/1995 Burnett et al.
5,491,783 A 2/1996 Douglas et al.
5,491,784 A 2/1996 Douglas et al.
5,500,859 A 3/1996 Sharma et al.
5,506,984 A 4/1996 Miller
5,515,534 A 5/1996 Chuah et al.
5,517,409 A 5/1996 Ozawa et al.
5,530,852 A 6/1996 Meske, Jr. et al.
5,530,853 A 6/1996 Schell et al.
5,537,132 A 7/1996 Teraoka et al.
5,537,590 A 7/1996 Amado
5,541,836 A 7/1996 Church et al.
5,546,447 A 8/1996 Skarbo et al.
5,546,529 A 8/1996 Bowers et al.
5,564,046 A 10/1996 Nemoto et al.
5,576,955 A 11/1996 Newbold et al.
5,581,460 A 12/1996 Kotake et al.
5,583,761 A 12/1996 Chou
5,603,025 A 2/1997 Tabb et al.
5,606,712 A 2/1997 Hidaka
5,608,900 A 3/1997 Dockter et al.
5,617,488 A 4/1997 Hong et al.
5,629,981 A 5/1997 Nerlikar
5,640,565 A 6/1997 Dickinson
5,644,740 A 7/1997 Kiuchi
5,646,416 A 7/1997 Van de Velde
5,649,222 A 7/1997 Mogilevsky
5,657,259 A 8/1997 Davis et al.
5,659,676 A 8/1997 Redpath
5,666,502 A 9/1997 Capps
5,694,523 A 12/1997 Wical
5,708,804 A 1/1998 Goodwin et al.
5,708,822 A 1/1998 Wical
5,708,825 A 1/1998 Sotomayor
5,724,593 A 3/1998 Hargrave, III et al.
5,724,597 A 3/1998 Cuthbertson et al.
5,727,129 A 3/1998 Barrett et al.
5,729,741 A 3/1998 Liaguno et al.
5,732,229 A 3/1998 Dickinson
5,740,252 A 4/1998 Minor et al.
5,745,360 A 4/1998 Leone et al.
5,745,908 A 4/1998 Anderson et al.
5,754,847 A 5/1998 Kaplan et al.
5,754,857 A 5/1998 Gadol
5,761,436 A 6/1998 Nielsen
5,761,656 A 6/1998 Ben-Shachar
5,761,659 A 6/1998 Bertoni
5,761,689 A 6/1998 Rayson et al.
5,764,906 A 6/1998 Edelstein et al.
5,778,363 A 7/1998 Light
5,781,189 A 7/1998 Holleran et al.
5,781,900 A 7/1998 Shoji et al.
5,781,904 A 7/1998 Oren et al.
5,787,386 A 7/1998 Kaplan et al.
5,793,972 A 8/1998 Shane
5,794,050 A 8/1998 Dahlgren et al.
5,794,228 A 8/1998 French et al.
5,794,259 A 8/1998 Kikinis
5,799,267 A 8/1998 Siegel
5,799,302 A 8/1998 Johnson et al.
5,802,559 A 9/1998 Bailey
5,805,886 A 9/1998 Skarbo et al.
5,805,911 A 9/1998 Miller
5,806,079 A 9/1998 Rivette et al.
5,815,830 A 9/1998 Anthony
5,819,092 A 10/1998 Ferguson et al.
5,822,539 A 10/1998 van Hoff
5,822,720 A 10/1998 Bookman et al.
5,826,257 A 10/1998 Snelling, Jr.
5,832,496 A 11/1998 Anand et al.
5,835,059 A 11/1998 Nadel et al.
5,835,089 A 11/1998 Skarbo et al.
5,845,238 A 12/1998 Fredenburg
5,855,007 A 12/1998 Jovicic et al.
5,859,636 A 1/1999 Pandit
5,860,073 A 1/1999 Ferrel et al.
5,862,325 A 1/1999 Reed et al.
5,864,848 A 1/1999 Horvitz et al.
5,870,702 A 2/1999 Yamabana
5,870,746 A 2/1999 Knutson et al.
5,873,107 A 2/1999 Borovoy et al.
5,875,443 A 2/1999 Nielsen
5,875,446 A 2/1999 Brown et al.
5,878,421 A 3/1999 Ferrel et al.
5,884,247 A 3/1999 Christy
5,884,302 A 3/1999 Ho

(56) References Cited

U.S. PATENT DOCUMENTS

| | | | |
|---|---|---|---|
| 5,884,309 | A | 3/1999 | Vanechanos, Jr. |
| 5,892,919 | A | 4/1999 | Nielsen |
| 5,893,093 | A | 4/1999 | Wills |
| 5,895,461 | A | 4/1999 | De La Huerga et al. |
| 5,896,321 | A | 4/1999 | Miller et al. |
| 5,896,533 | A | 4/1999 | Ramos et al. |
| 5,897,475 | A | 4/1999 | Pace et al. |
| 5,900,004 | A | 5/1999 | Gipson |
| 5,905,866 | A | 5/1999 | Nakabayashi et al. |
| 5,905,991 | A | 5/1999 | Reynolds |
| 5,907,838 | A | 5/1999 | Miyasaka et al. |
| 5,913,214 | A | 6/1999 | Madnick et al. |
| 5,920,859 | A | 7/1999 | Li |
| 5,924,090 | A | 7/1999 | Krellenstein |
| 5,926,808 | A | 7/1999 | Evans et al. |
| 5,930,471 | A | 7/1999 | Milewski et al. |
| 5,940,843 | A | 8/1999 | Zucknovich et al. |
| 5,946,647 | A | 8/1999 | Miller et al. |
| 5,953,718 | A | 9/1999 | Wical |
| 5,963,205 | A | 10/1999 | Sotomayor |
| 5,963,940 | A | 10/1999 | Liddy et al. |
| 5,963,950 | A | 10/1999 | Nielsen et al. |
| 5,970,505 | A | 10/1999 | Ebrahim |
| 5,974,413 | A | 10/1999 | Beauregard et al. |
| 5,983,171 | A | 11/1999 | Yokoyama et al. |
| 5,987,403 | A | 11/1999 | Sugimura |
| 5,987,460 | A | 11/1999 | Niwa et al. |
| 5,987,475 | A | 11/1999 | Murai |
| 5,999,938 | A | 12/1999 | Bliss et al. |
| 6,006,218 | A | 12/1999 | Breese et al. |
| 6,006,242 | A | 12/1999 | Poole et al. |
| 6,014,677 | A | 1/2000 | Hayashi et al. |
| 6,021,403 | A | 2/2000 | Horvitz et al. |
| 6,022,222 | A | 2/2000 | Guinan |
| 6,026,088 | A | 2/2000 | Rostoker et al. |
| 6,026,398 | A | 2/2000 | Brown et al. |
| 6,028,605 | A | 2/2000 | Conrad et al. |
| 6,031,537 | A | 2/2000 | Hugh |
| 6,038,573 | A | 3/2000 | Parks |
| 6,047,252 | A | 4/2000 | Kumano et al. |
| 6,055,531 | A | 4/2000 | Bennett et al. |
| 6,061,675 | A | 5/2000 | Wical |
| 6,067,565 | A | 5/2000 | Horvitz |
| 6,076,088 | A | 6/2000 | Paik et al. |
| 6,085,201 | A | 7/2000 | Tso |
| 6,085,226 | A | 7/2000 | Horvitz |
| 6,092,074 | A | 7/2000 | Rodkin et al. |
| 6,094,649 | A | 7/2000 | Bowen et al. |
| 6,108,674 | A | 8/2000 | Murakami et al. |
| 6,122,647 | A | 9/2000 | Horowitz et al. |
| 6,126,306 | A | 10/2000 | Ando |
| 6,128,635 | A | 10/2000 | Ikeno |
| 6,137,911 | A | 10/2000 | Zhilyaev |
| 6,151,624 | A | 11/2000 | Teare et al. |
| 6,154,738 | A | 11/2000 | Call |
| 6,178,434 | B1 | 1/2001 | Saitoh |
| 6,182,133 | B1 | 1/2001 | Horvitz |
| 6,185,550 | B1 | 2/2001 | Snow et al. |
| 6,185,576 | B1 | 2/2001 | McIntosh |
| 6,223,570 | B1 | 5/2001 | Chen |
| 6,233,570 | B1 | 5/2001 | Horvitz |
| 6,260,035 | B1 | 7/2001 | Horvitz et al. |
| 6,262,730 | B1 | 7/2001 | Horvitz et al. |
| 6,272,505 | B1 | 8/2001 | De La Huerga |
| 6,289,342 | B1 | 9/2001 | Lawrence et al. |
| 6,292,768 | B1 | 9/2001 | Chan |
| 6,308,171 | B1 | 10/2001 | De La Huerga |
| 6,311,177 | B1 | 10/2001 | Dauerer et al. |
| 6,311,194 | B1 | 10/2001 | Sheth et al. |
| 6,323,853 | B1 | 11/2001 | Hedloy |
| 6,338,059 | B1 | 1/2002 | Fields et al. |
| 6,373,502 | B1 | 4/2002 | Nielsen |
| 6,438,545 | B1 | 8/2002 | Beauregard et al. |
| 6,442,545 | B1 | 8/2002 | Feldman et al. |
| 6,516,321 | B1 | 2/2003 | De La Huerga |
| 6,519,603 | B1 | 2/2003 | Bays et al. |
| 6,556,984 | B1 | 4/2003 | Zien |
| 6,571,241 | B1 | 5/2003 | Nosohara |
| 6,601,026 | B2 | 7/2003 | Appelt et al. |
| 6,618,733 | B1 | 9/2003 | White et al. |
| 6,625,581 | B1 | 9/2003 | Perkowski |
| 6,629,079 | B1 | 9/2003 | Spiegel et al. |
| 6,651,059 | B1 | 11/2003 | Sundaresan et al. |
| 6,697,824 | B1 | 2/2004 | Bowman-Amuah |
| 6,732,090 | B2 | 5/2004 | Shanahan et al. |
| 6,732,361 | B1 | 5/2004 | Andreoli et al. |
| 7,003,522 | B1 | 2/2006 | Reynar et al. |
| 7,032,174 | B2 | 4/2006 | Montero et al. |
| 7,130,861 | B2 | 10/2006 | Bookman et al. |
| 7,287,218 | B1 | 10/2007 | Knotz et al. |
| 7,496,854 | B2 | 2/2009 | Hedloy |
| RE40,731 | E | 6/2009 | Bookman et al. |
| 2002/0035581 | A1 | 3/2002 | Reynar et al. |
| 2002/0036654 | A1 | 3/2002 | Evans et al. |
| 2002/0062353 | A1 | 5/2002 | Konno et al. |
| 2002/0065891 | A1 | 5/2002 | Malik |
| 2002/0091803 | A1 | 7/2002 | Imamura et al. |
| 2002/0099730 | A1 | 7/2002 | Brown et al. |
| 2002/0184247 | A1 | 12/2002 | Jokela et al. |
| 2003/0004909 | A1 | 1/2003 | Chauhan et al. |
| 2003/0033290 | A1 | 2/2003 | Garner et al. |
| 2003/0154144 | A1 | 8/2003 | Pokorny et al. |
| 2003/0187587 | A1 | 10/2003 | Swindells et al. |
| 2003/0212527 | A1 | 11/2003 | Moore et al. |

FOREIGN PATENT DOCUMENTS

| | | | |
|---|---|---|---|
| EP | 0 725 353 | B1 | 10/2001 |
| JP | 03-174653 | A | 7/1991 |
| JP | 04-220768 | A | 8/1992 |
| JP | 04-288674 | A | 10/1992 |
| JP | 04-320530 | A | 11/1992 |
| JP | 04-320551 | A | 11/1992 |
| JP | 05-012096 | A | 1/1993 |
| JP | 05-128157 | A | 5/1993 |
| WO | WO-95/04974 | A1 | 2/1995 |

OTHER PUBLICATIONS

Almasi, et al., Highly Parallel Computing 2nd Edition, The Benjamin/Cummings Publishing Company, Inc.,Chapter 2, p. 38-51 and 87-95, 1994.

Apple Internet Address Detector User's Manual, Aug. 28, 1997, 17 pgs.

Baez, et al., "Portable Translator", IBM Technical Bulletin, vol. 37, No. 11, p. 185-188, Nov. 1994.

Block and Edlin, Addressmate Automatic Envelope Addressing Program, User's Manual (1991), 88 pgs.

Brookshear, Introduction to "Computer Science, An Overview", Benjamin/Cummings Publishing, p. 17, 1988.

Cohen, et al., "Method for Automatic Analysis of Meter in (both) Poetry and Prose", IBM Technical Bulletin, vol. 32, No. 9B, p. 224-226, Feb. 1990.

Delivery and Retrieval Technology, Electronic Delivery, Document Management, Catalog Publishing, Page Layout, Hardware, Seybold Seminars Boston—Special Report, vol. 2, No. 8, Apr. 1994, 19 pgs.

Developer's Guide to Apple Data Detectors, Dec. 1997, 35 pgs.

Dunnington, et al., "Methodology and Apparatus for Translation of Text to Sign Language Images", vol. 37, No. 04A, p. 229-230, Apr. 1994.

Eisen, et al., "Multilingual Multimedia Hyperlink Network Design", IBM Technical Bulletin, vol. 36, No. 09B, p. 471-472, Sep. 1993.

Eisen, et al., "OS/2 Presentation Manager Controls Enabled for Hypermedia Link Markers", IBM Technical Bulletin, vol. 34, No. 10B, p. 433-434, Mar. 1992.

Elliott, "Tuning up HyperCard's Database Engine", Supplement to Dr. Dobb's Journal, p. 39s-41s, Apr. 1993.

Foley, et al., Introduction to "Computer Graphics—Principles and Practice 2nd Ed. in C", Addison-Wesley Publishing Company, Inc., p. 1-9, 1996.

(56) References Cited

OTHER PUBLICATIONS

Fuger et al., Proceedings of The First IEEE Conference on Evolutionary Computation, IEEE World Congress on Computational Intelligence, Walt Disney World Dolphin Hotel, Orlando, FL, vol. I, p. 229-234, Jun. 27-Jun. 29, 1994.
Germain, et al., "Hypertext Document Update", IBM Technical Bulletin, vol. 34, No. 8, p. 22-23, Jan. 1992.
Glinert, A Pumped-Up Publishing Pro, Computer Shopper, Computer Select, p. 462, Apr. 1997.
Goodman, Web Documents Without HTML, Computer Select, Computer Shopper, Apr. 1997, 3 pgs.
Goose, et al., "Unifying Distributed Processing and Open Hypermedia through a Heterogeneous Communication Model", University of Southampton, Technical Report No. 95-6, p. 1-12, Nov. 1995.
Haak, Personal Computing—WordPerfect News: WordPerfect for Windows 7.0; A Sneak Preview, Colorado State University, vector Academic Computing & Network Services, vol. 13, No. 3, Jan./Feb. 1996.
MacWorld Article on Language Learning Breakthrough, 2 pages, Dec. 1995.
Marshall, Acrobat, Common Ground Extend Reach Beyond Document Viewing, InfoWorld, Computer Select, Apr. 21, 1997, p. 105, 4 pgs.
Microsoft Corporation, Microsoft Word 97, screen printouts, 4 pages, 1997.
Microsoft Word 97 Help File entitled Automatically check spelling and grammar as you type (1997), 1 pg.
Montana, "Automated Parameter Tuning for Interpretation of Synthetic Images", Handbook of Genetic Algorithms, edited by Lawrence Davis, Chapter 19, p. 282-311, 1991.
Nelson, FrenchNow 3.0 Language-Learning Tool, Macworld Reviews, p. 83, Dec. 1995.
Novell GroupWise User's Guide for Windows 16-BIT, Version 5.2, 1993, MS 125993, Novell, Inc., Orem, Utah. (1993), 235 pgs.
Order in the matter of *Sentius Corporation* v. *Flyswat, Inc.* in the US District Court for the Northern District of California dated Aug. 5, 2002, 29 pgs.
Order re: Construction of Claim 8 of United States Patent No. 5,822,720 in the matter of *Sentius Corporation* v. *Flyswat, Inc.,* in the US District Court for the Northern District of California dated Apr. 4, 2002, 41 pgs.
Seybold Seminars and Imprinta '92, part 1: RIPs and Recorders, Seybold Report on Publishing Systems, vol. 21, No. 12, p. 10-43 (1992), 36 pgs.
Takehi, "Implementing Memory Efficient Hypertext in Online Manual Tool", IBM Technical Bulletin, vol. 33, No. 11, p. 259-263, Apr. 1991.
Thistlewaite, "Automatic Construction and Management of Large Open Webs", Information Processing and Management, vol. 33, pp. 161-173 (published Mar. 1997).
User Manual For AddressMate and AddressMate Plus by AddressMate Software (1994-1995), 435 pgs.
Weibel, Publish to Paper and the Web, Computer Select, Dec. 1996, PC/Computing, p. 130, 2 pgs.
Winston, et al., Finding Patterns in Images, LISP 3rd Edition, Chapter 31, p. 456-483, Addison-Wesley Publishing Company, 1989.
Yankelovich, et al., "Reading and Writing the Electronic Book", Computer, vol. 18, No. 10, p. 15-30, Oct. 1985.
Copy of Fourth Supplemental Patent Local Rule 3-3 Invalidity Contentions, *Sentius International, LLC*, v. *Microsoft Corporation*, In the United States District Court for the Northern District of California San Jose Division, Case No. 5:13-cv-00825 PSG, Dated Apr. 21, 2014, (13 pages).
"Windows Spell: Spell Checking for Microsoft Windows" manual, Palantir Software, 1986, 36 pages.
A sales brochure from Transparent Language of Hollis, NH about the Transparent Language System software, No Date.
A sample screen from the software of Transparent Language of Hollis, NH, No Date.

SYSTEM AND METHOD FOR LINKING STREAMS OF MULTIMEDIA DATA TO REFERENCE MATERIAL FOR DISPLAY

Matter enclosed in heavy brackets [ ] appears in the original patent but forms no part of this reissue specification; matter printed in italics indicates the additions made by reissue.

*Note: More than one reissue patent application has been filed for the reissue of U.S. Pat. No. 5,822,720. The reissue patent applications are U.S. Reissue patent application Ser. No. 11/064,519, filed Feb. 24, 2005, now U.S. Reissue Pat. No. Re. 40,731, U.S. Reissue patent application Ser. No. 12/480,556, filed Jun. 8, 2009, now U.S. Reissue Pat. No. Re. 43,633, and the present U.S. Reissue patent application Ser. No. 13/603,315, filed Sep. 4, 2012, which is a continuation reissue application of U.S. Reissue patent application Ser. No. 12/480,556.*

This is a continuation of application Ser. No. 08/197,157 filed Feb. 16, 1994 now abandoned.

BACKGROUND OF THE INVENTION

1. Technical Field

The present invention relates to indexing displayed elements. More particularly, the present invention relates to a novel indexing scheme that is useful in such applications as learning a foreign language, for example a language based upon an ideographic alphabet, such as Japanese.

2. Description of the Prior Art

As the global economy turns the world's many nations into what media visionary Marshall McLuhan referred to as a global village, the need to learn and use new or specialized information, such as a language other than one's native language, becomes increasingly important. For example, there is a tremendous international demand for information related to Japan. Inside Japan, there is an abundance of information available in the Japanese language in numerous media forms. Japan has five national newspapers, seven major broadcasting networks, and several hundred book and magazine publishers. Japanese television focuses on the most obscure topics; and there are special interest magazines covering the full spectrum of Japanese society. Speakers of the Japanese language can find information on just about any topic imaginable. Unfortunately, outside of Japan this information is in short supply and the information that is available is primarily in English.

Individuals trying to learn about Japan are faced with the dilemma of either relying on English language sources or going through the pains of learning Japanese. English language information on Japan must go through the translation process. This results in time delays in obtaining necessary information, as well as in distortions in meaning. Furthermore, economics itself places restrictions on what information makes it's way into English and what information does not. For general and introductory information on Japan, the English-based media is providing a valuable service. But for people who want to do more than scratch the surface, such information is far from sufficient.

A large number of non-native speakers have sought to study Japanese in universities or in professional language schools. In recent years, the interest level in Japanese among first year level college students has soared, such that it is rated second only to Spanish in some surveys. The number of people studying Japanese in the mid-1980's in the United States was 50,000. This number has recently grown to 400,000 persons. But the study of Japanese language is plagued by the burdens of learning Kanji, the ideographic alphabet in which Japanese is written. Thus, the standing room only first-year Japanese language class in many universities soon becomes the almost private lesson-like third year class due to student attrition resulting from the difficulty of mastering Kanji.

The situation in Japan for foreigners is not much more encouraging. The cost of living in Japan poses a major barrier for both business people and students. There are currently over 300,000 United States citizens working or studying in Japan. But in recent years, foreign companies have been cutting their foreign staff. This, in part, has been in response to the enormous expense associated with maintaining them in Japan; but it is also a statement about the effectiveness of a large percentage of these people, who typically possess no Japanese language skills or background. Nevertheless, the necessity to do business in Japan is clear to most major United States companies, and access to Japan's inside information is critical to the success of such companies.

The situation in Japanese universities is also discouraging. There are currently about 30,000 foreign students in Japanese universities, compared to a total of over 300,000 foreign students studying in the United States. Ninety percent of the foreign students in Japan are from Asia, while there are less than 1,000 students in Japan from the United States. The cost of living and housing again contribute greatly to this disparity, but the language barrier must be seen as the prime hurdle that causes students to abandon the attempt to explore Japan. In the future, the desirability for students and researchers to work in Japan should increase due to the growth of "science cities" and the increase in the hiring of foreign researchers by Japanese corporations. The burden of studying Japanese, however, remains.

In total there are over 60,000 people enrolled in Japanese language programs in Japan; and according to the Japan Foundation, there are approximately 1,000,000 Japanese language students worldwide, with a total of over 8,200 Japanese language instructors in 4,000 institutes. However, without a more effective and productive methodology for reading Japanese and for building Japanese language vocabulary, the level and breadth of the information making its way to non-natives should not be expected to improve.

The foregoing is but one example of the many difficulties one is faced with when acquiring or using difficult or unfamiliar material. The first challenge anyone reading a difficult text, is faced with is the issue of character recognition and pronunciation. For example, a student of the Japanese language spends many frustrating hours counting character strokes and looking up characters in a dictionary. Challenges such as this are the primary reason so many people give up on Japanese after a short trial period. It is also the reason that people who continue to pursue the language are unable to build an effective vocabulary.

Knowing the "yomi" or pronunciation or reading of a word is essential to memorize and assimilate the word into one's vocabulary. This allows the student to read a word in context and often times deduce its meaning. But in many cases, the word may be entirely new to the reader, or it may be a usage that the reader has never seen. Looking up the word in the dictionary or asking a native speaker are the only options available to a student. Once the yomi for the word is known, i.e. the meaning and understanding of the word in context, the final challenge is to memorize the word and make it a part of a usable vocabulary.

The sheer number of characters in ideographic alphabets, such as Kanji, presents unique challenges for specifying and identifying individual characters.

Various schemes have been proposed and descriptions can be found in the literature for the entry of Kanji characters into computers and the like.

See, for example, Y. Chu, Chinese/Kanji Text and Data Processing, IEEE Computer (January 1985); J. Becker, Typing Chinese, Japanese, and Korean, IEEE Computer (January 1985); R. Matsuda, Processing Information in Japanese, IEEE Computer (January 1985); R. Walters, Design of a Bitmapped Multilingual Workstation, IEEE Computer (February 1990); and J. Huang, The Input and Output of Chinese and Japanese Characters, IEEE Computer (January 1985).

And, see J. Monroe, S. Roberts, T. Knoche, Method and Apparatus for Processing Ideographic Characters, U.S. Pat. No. 4,829,583 (9 May 1989), in which a specific sequence of strokes is entered into a 9×9 matrix, referred to as a training square. This sequence is matched to a set of possible corresponding ideographs. Because the matrix senses stroke starting point and stroke sequences based on the correct writing of the ideograph to be identified, this system cannot be used effectively until one has mastered the writing of the ideographic script. See, also G. Kostopoulos, Composite Character Generator, U.S. Pat. No. 4,670,841 (2 Jun. 1987); A. Carmon, Method and Apparatus For Selecting, Storing and Displaying Chinese Script Characters, U.S. Pat. No. 4,937,745 (26 Jun. 1990); and R. Thomas, H. Stohr, Symbol Definition Apparatus, U.S. Pat. No. 5,187,480 (16 Feb. 1993).

A text revision system is disclosed in R. Sakai, N, Kitajima, C. Oshima, Document Revising System For Use With Document Reading and Translation System, U.S. Pat. No. 5,222,160 (22 Jun. 1993), in which a foreigner having little knowledge of Japanese can revise misrecognized imaged characters during translation of the document from Japanese to another language. However, the system is provided for commercial translation services and not intended to educate a user in the understanding or meaning of the text.

Thus, although much attention has been paid, for example, to the writing, identification, and manipulation of ideographic characters, none of these approaches are concerned with providing a language learning system. The state of the art for ideographic languages, such as Japanese, does not provide an approach to learning the language that meets the four primary challenges discussed above, i.e. reading the language (for example, where an ideographic alphabet is used), comprehending the meaning of a particular word encountered while reading the language, understanding the true meaning of the word within the context that the word is used, and including the word in a personal dictionary to promote long term retention of the meaning of the word. A system that applies this approach to learning a language would be a significant advance in bridging the gap between the world's diverse cultures because of the increased understanding that would result from an improved ability to communicate with one another. Such system would only be truly useful if it were based upon an indexing scheme that allowed meaningful manipulation and display of the various elements of the language.

SUMMARY OF THE INVENTION

The invention provides a unique system for indexing displayed elements and finds ready application, for example in a language learning system that enhances and improves the way non-natives read foreign languages, for example the way a native English speaker reads Japanese. The language learning system provides a more effective way for people to read and improve their command of the foreign language, while at the same time communicating insightful and relevant cultural, social, and economic information about the country.

The learning model used by the language learning system is straightforward and is based upon methods that are familiar to most learners of foreign languages. The system addresses the four challenges of reading a foreign language, such as Japanese: i.e. reading the foreign word or character, such as Kanji in the case of a language having an ideographic alphabet, such as Japanese; comprehending the meaning of the word; understanding the word in context; and including the word in a personal vocabulary.

The exemplary embodiment of the invention includes one or more foreign language books that are read on an electronic display of a personal computer. English word references are available for each word in such books. The definitions of such words are derived from well known foreign language dictionaries. With regard to the Japanese language, the system saves significant amounts of time and effort by eliminating the need for the user to look up Japanese characters in a Kanji dictionary.

When one uses the system, the pronunciations or readings ('yomi') for all words are immediately viewable in a pop-up window without accessing a disk based database, for example by clicking a mouse on a selected word or phrase. In the same pop-up window, the system provides an English reference to any word that is also selected by clicking on the selected word or phrase. The system provides extensive notes for difficult phrases and words not normally found in a dictionary, and includes a relational database designed for managing and studying words. This allows a user to build a personal database of words that he would like to master. Words may also be entered from other sources that are currently in paper or other electronic formats. A unique indexing scheme allows word-by-word access to any of several external multi-media references.

DETAILED DESCRIPTION OF THE INVENTION

The invention provides a system that is designed to enhance and improve the way one reads or learns to read a difficult text, such as a foreign language, especially a language based upon an ideographic alphabet, such as Kanji which is used in the Japanese language. The text may be any of actual text based material, or audio, video, or graphic based information. In the language learning application, the system is modeled on the process by which the foreign language is read and addresses the problems most persons face when reading a language that is different from their own.

The exemplary embodiment of the invention is based upon two powerful functional modules that provide a comprehensive approach to reading and learning a foreign language, such as Japanese. The first module is an electronic viewer that gives the user access to reference information on each word in the electronic text at a word by word level. The second module is a relational database that allows a user to create word lists with practically no limit in size. The two modules are integrated to provide the user with everything needed to read the foreign language quickly and enjoyably, as well as to build their own individual vocabulary.

Figure 1:
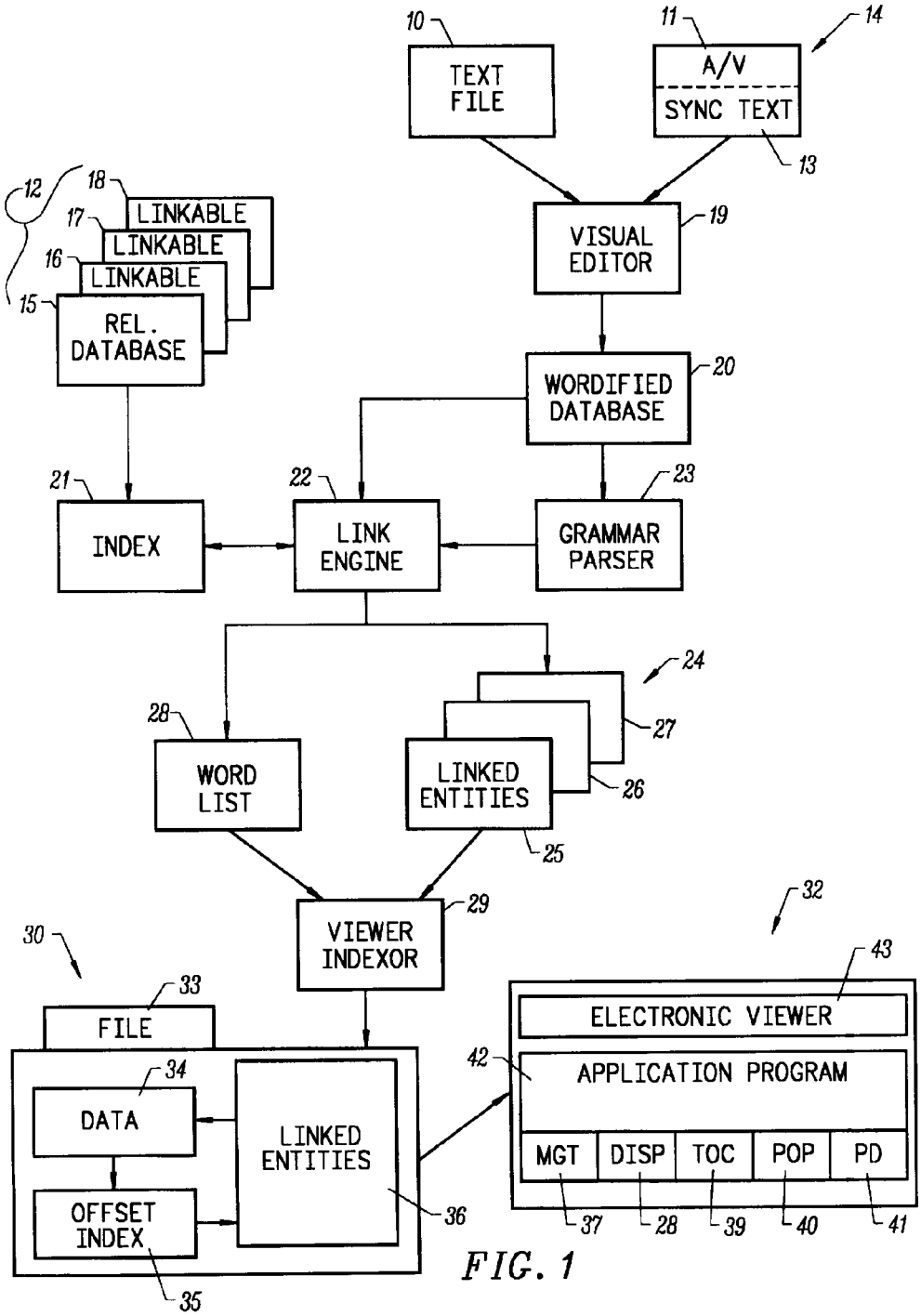
FIG. 1 is a block schematic diagram of a language learning system according to the invention.

FIG. 1 is a block schematic diagram of an exemplary embodiment of the invention that implements a language learning system. An electronic book and/or a multi-media source material is provided as a teaching resource. A text file 10 and/or a multimedia source 14, consisting of an audio/video file 11 and synchronized text 13, which may include sound, images, and/or video is edited during construction of a linked text database by a visual editor 19 that used to build a wordified database 20. The database 20 sources a grammar parser 23 and a link engine 22 that builds an index 21 which, in turn, locates each textual and audio/video reference in the source material. The index provides a location for each reference in a database 12 that includes a relational database engine 15, and linkable entities, such as text references 16, audio references 17, graphic references 18, and the like.

The link engine 22 outputs the selected text to a word list 28 derived from the input text file 10 and/or audio/video information 14, and also outputs the reference information 24, consisting of linkable entities 25, 26, 27, which are derived from the indexed database 12. The indexor/viewer 29 creates a multi-media resource 30, such as a file 33 that was processed as described above to produce a data resource 34, an offset index 35, and linked entities 36 to the data resource for access by the user.

A user interface 32 to the system includes an electronic viewer 43 that runs along with the system application program 42 and provides the following functional elements: index management 37, user display 38, a table of contents 39, a pop-up display 40, and a personal dictionary 41.

The electronic viewer module is used to view and read the electronic books provided with the language learning system. The module includes the following features:

1. One-click, pop-up information for all words containing foreign language words;
2. A word display palette;
3. A contents menu for each book;
4. Search functions;
5. Selectable browse and edit modes; and
6. The ability to copy words and associated information into personal dictionary.

The personal dictionary is a relational database that is optimized to manage and study words. Unlike electronic dictionaries, where only the word entries of the dictionary are searchable, the personal dictionary of the system herein allows one to search on each of eight or more keys associated with a word.

The following functions are supported by the personal dictionary:

1. Display of words in an easy to read, easy to access format;
2. Full relational database capabilities for the following: the word, the pronunciation, English reference, notes, category, source, priority, and review date;
3. Search capabilities for any item;
4. Capabilities to store an unlimited number of words;
5. A flash word feature to allow self-testing in sorted or random order; and
6. Capabilities to review words sorted by any word key.

The personal dictionary also allows the user to enter words from other sources that are currently in paper or other electronic formats. For example, a user can copy all the words that they have in paper format from study lists and notes. With this feature, a student can have all of his study materials in one easy to access database. Users can also import and export data in a text format supported by standard word processor and spreadsheet programs.

The exemplary personal dictionary includes a base 500-word vocabulary list designed for the beginning student. A variety of words are included related to such general topics as: foods and drink, family, health, the body, commuting and transportation, environment, economics, finance, politics, companies, industries, computers, sports, and the language itself.

The system includes one or more electronic books. The words in each book is fully supported with readings, English references, and hypernotes. In the exemplary embodiment of the invention there are typically over 10,000 words, as well as over 1,000 notes presented in an easy to read, easy to memorize format.

The English reference feature of the system provides basic information to help users understand the word in its context. For each word, a generalized definition of the word is provided. The pop-up fields are used to give the user a quick reference to the word and to allow the user to continue reading or reviewing the text.

Current electronic book formats provide simple hyperlinks in what is termed hypertext or multimedia. Hyperlinks to date have been simple pointers that directly link text with other text, graphics, or sound within the text file itself. For reference materials, such as electronic encyclopedias, and dictionaries, hyperlinks provide a quick and easy way to find related material to a topic or subject. However, these links must be hard coded and are therefore cumbersome to author. The format of the system herein described provides a new means of relating text, pictures, and/or video with information to enrich and expand the impact of every element in a text, picture, or video. This format differs from current electronic books which only link text with other parts of text or content.

In the new format of the present system, every word or sound, for example, can be linked to information not contained within the text using an indexing method that maps a single word or phrase to a table that contains external reference material. This reference can be in the form [or] *of* text, graphics, images, movies, and/or sound. Thus, the resource materials, such as the text, remains unaltered and therefore compact in terms of file size. Thus, the resource materials, for example the text, takes up less disk space and runs faster.

Figure 2:
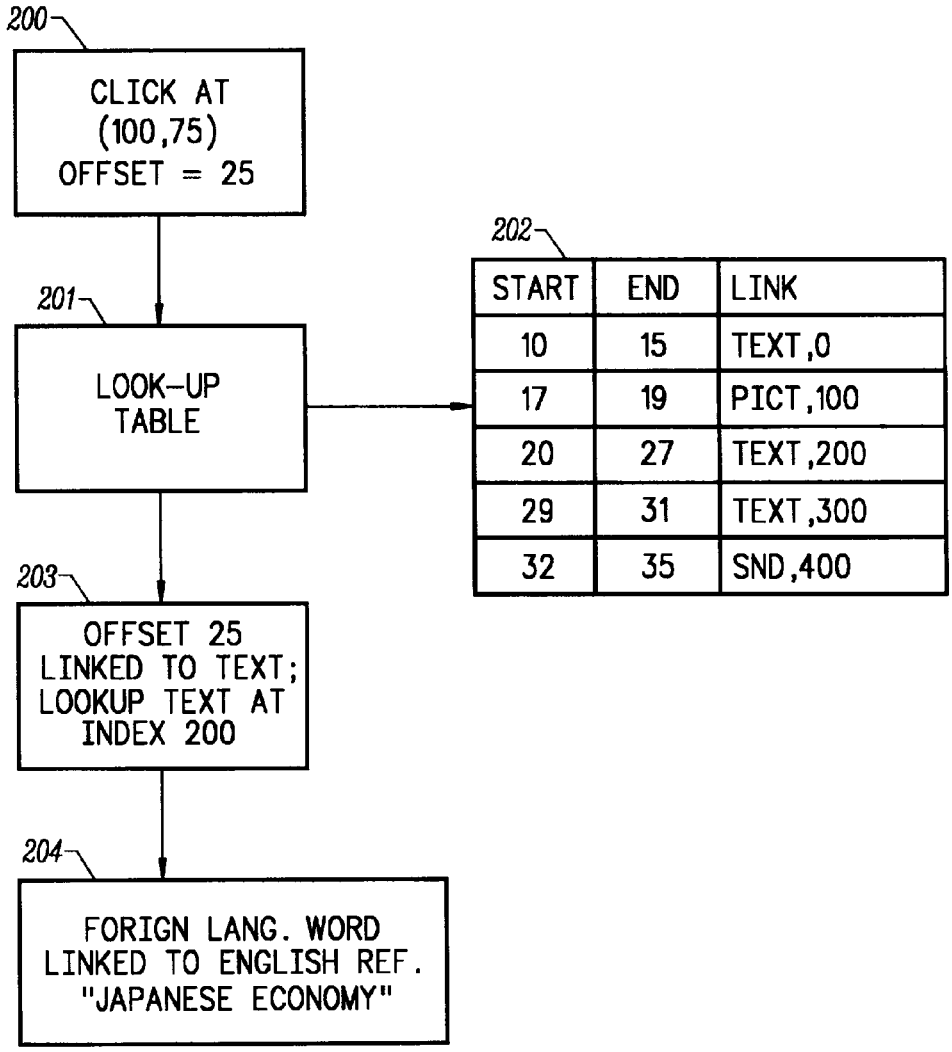
FIG. 2 is a flow diagram in which the mechanism for indexing and linking text to external references is shown according to the invention.

FIG. 2 is a flow diagram in which the mechanism for indexing and linking text to external references is shown according to the invention. To find a reference to a particular word or other selected entry displayed on the screen, the user clicks the text that is viewed with a pointing device, such as a mouse (200). The click position is determined and used to calculate an offset value within the text (200). In the example shown in FIG. 2, the user clicks at a particular location, e.g. horizontal and vertical coordinates 100 and 75, respectively, and an offset value of 25 is returned. The offset value is compared to the start and end position indices stored in a look-up table (201, 202). The link between the selected text and the external reference is resolved (203), and the external reference is retrieved and displayed to the user (204). In the example of FIG. 2 an offset of 25 is located at the look-up table location having a start point of 20 and an end point of 27 and is linked to text located at position 200. As can be seen from the look-up table (202), the link may be to text, sound, pictures, and video. In the example, the text linkage is to the English language word "Japanese economy".

The actual indexing process is completed in several steps, including word cuts, linking, and compilation.

Word Cuts

The word cutting process is accomplished using a simple visual editor, for example a point and click system using a pointing device, such as a mouse. The process divides the text into the individual components of text that are linked with the additional reference material. The original text is provided by a publisher in electronic form in a raw binary text format (e.g. an ASCII text file or other word processor file). This text is then divided up into the component word or phrases in preparation for the next step.

Linking

The linking process takes the text after the word cut process and links it to an external reference. The database 20 sources a grammar parser 23 and a link engine 22 that builds an index 21 which, in turn, locates each textual and audio/video reference in the source material. In the case of language learning, the component words and phrases are linked to a foreign language dictionary. In other cases, links may be made to other reference materials, such as graphics and/or sound.

Compilation

After linking, the text and references are compiled. During compilation, the cut text is reassembled to create an image of the text that the end user sees. At this point additional formatting may be applied to the text for final display. Indices of the component words and phrases are built with links to the reference material and duplicate references are consolidated to conserve memory and storage requirements.

A key feature of the system format is the method by which the original book text is indexed and linked with the external references. During the compile process an image of the text is created. When the image is created, the cuts are indexed based upon the position offset from the beginning of the text. The start and end points of the cut text are recorded in a look-up table along with the links to external references. The number and type of links for any component is dynamic. This means that a single entry could have several different references attached to it, each containing different forms of data.

The user interacts with the electronic book using a pointing device. When the user "clicks" within the text image, the location of the pointer is determined. The location is converted into a position offset from the beginning of the text and used to determine which component word or phrase was selected. The process involves comparing the offset with the start and end values stored in the look-up table as discussed above in connection with FIG. 2. When the offset value falls between a component's start and end points, a match is made and the external references can be resolved.

English Reference

Figure 3:
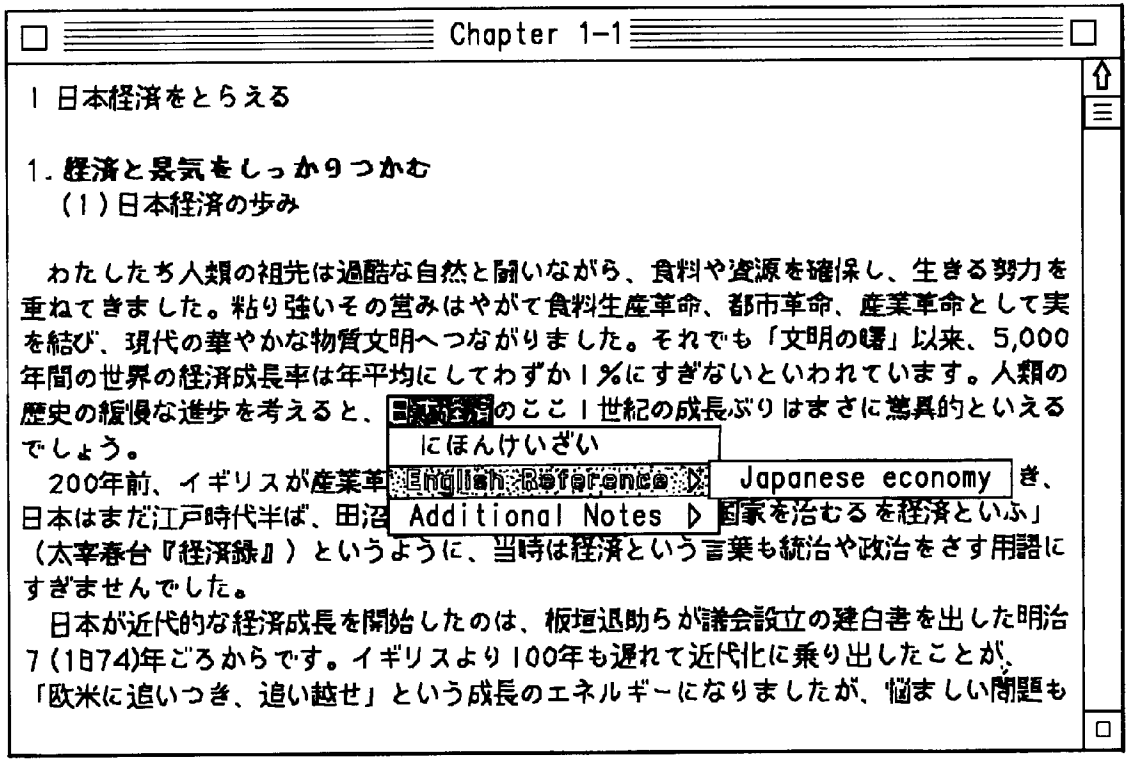
FIG. 3 is a screen display showing a highlighted Japanese word and a pop-up menu, including an English reference to the Japanese word, according to the invention.

FIG. 3 is a screen display showing a highlighted Japanese word and a pop-up menu, including a translation of the Japanese word, according to the invention. The following section explains the English reference pop-ups associated with each word:

The English reference is intended to give the user basic information to help him understand a selected word in its context. A majority of the word definitions found in the English reference are not the direct translation of the word in that particular context. They are mostly generalized definitions of the given word. These pop-up fields give the user a quick reference to the word and allow him to continue reading or reviewing the text without the need to stop and access a dictionary. In applying the invention to other languages, for example Korean or Chinese, or to difficult materials, such as highly technical or complex matters, appropriate external references should be selected.

In the exemplary embodiment of the invention, a priority is placed on making the text readable, rather than on creating a detailed grammatical description of it. The English reference is not considered a direct translation of the foreign language, but rather is preferably a contextual definition based upon the word's meaning within the text.

Definitions

Definitions in dictionaries are written for practical use. Accordingly, word and sentence translations are preferably written in modern English at a level acceptable to native speakers. The types of phrases and words covered by the English reference are preferably of great variety. The English translation should therefore be highly readable and useful.

Hyper Notes

Figure 4:
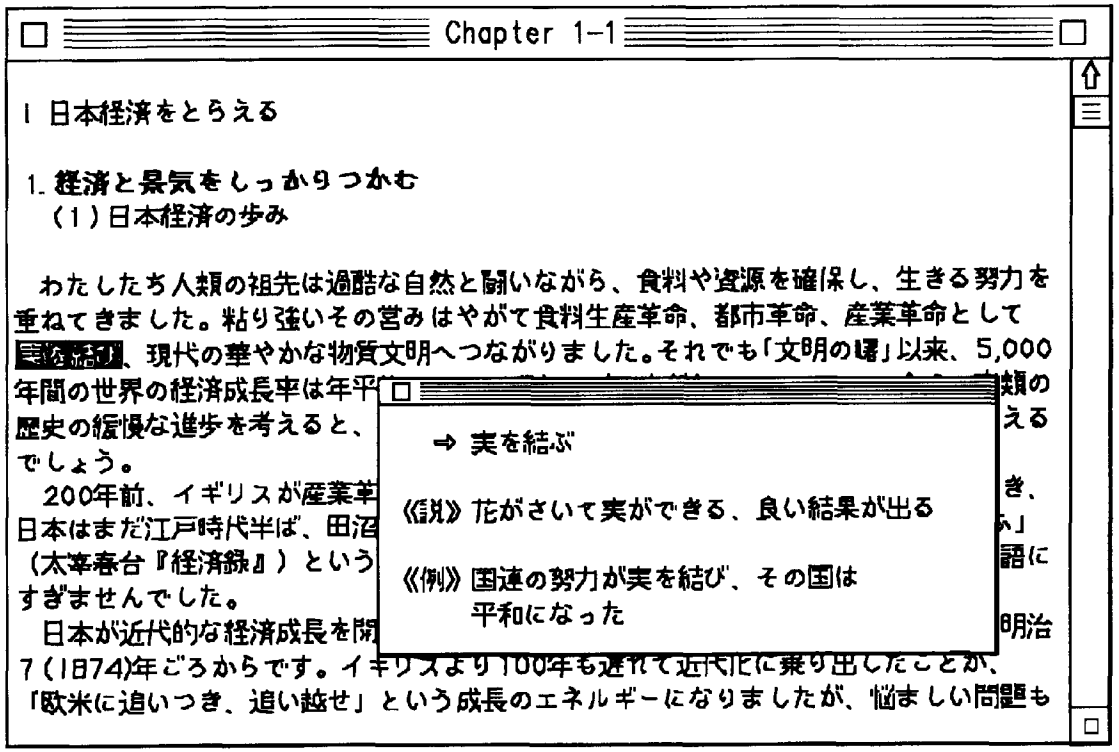
FIG. 4 is a screen display showing a highlighted Japanese word and a pop-up menu, including Japanese language annotations of the Japanese word, according to the invention.

FIG. 4 is a screen display showing a highlighted Japanese word and a pop-up menu, including Japanese language annotations of the Japanese word, according to the invention.

Hyper notes are provided for a great number of words and phrases included in the system. Most of the explanations are grammatical in nature, but others simply explain the passage in further depth or rephrase the foreign language word or phrase in simpler language. The notes have been written in the foreign language because it is believed that this is the best way for students of the language to improve their skills. As in the main text, the yomi and meanings of the words are given in a pop-up form.

Using the Electronic Viewer Module

The electronic viewer module provides the following pull-down menus: File, Edit, Words, View.

The File Menu includes:

1. Open (opens up a book for reading);
2. Close (closes a book);
3. Personal Dictionary (opens the personal dictionary);
4. Import Words (imports a tab delineated file into the personal dictionary);
5. Export Words (exports a tab delineated file into the personal dictionary); and Quit (quits the applications).

The Edit Menu Includes:

1. Undo (undoes a previously deleted entry in the personal dictionary fields);
2. Cut (cuts a highlighted block of text in the personal dictionary fields);
3. Copy (copies the selected text into the clipboard in either the electronic viewer module or the personal dictionary); and
4. Paste (pastes the copied text into the target field in the personal dictionary).

The Words Menu includes:

1. Find (displays the search dialogue box);
2. Find Next (finds the next entry using the previously entered search word);
3. Next (goes to the next word in the personal dictionary based on the current sort setting);
4. Prey (goes to the previous word in the personal dictionary based on the current sort setting);
5. Jump to Text (jumps from the personal dictionary to the source of the word in the original text); and
6. Flash Words (displays the words in the personal dictionary in slide show fashion).

The View Menu includes:

1. Browse (sets the program to Browse Mode, indicated by the arrow cursor);
2. Edit (sets the program to Edit Mode, indicated by the I-beam cursor);

3. Show Note Guides (displays the location of the Notes in the text of the viewer);
4. Show Notes (displays the Notes field in the personal dictionary);
5. Show Info (displays the Word Information and sort control button in the personal dictionary); and
6. Show Palette (displays the Word Display Palette with the electronic viewer module).

After a study session starts, a Table of Contents for the selected book appears. By clicking on any item, the user is able to go to the desired section of the book. The selected chapter appears as a normal text file. The electronic viewer window has a display region with a button to display the Table of Contents. The current chapter name of the selected book is also displayed in this area. To select a word or phrase in the book, the user clicks on a word that is not understood and a pop-up menu immediately appears (see FIG. 3). The pop-up information contains the yomi, the English reference, and the notes selection. If the pop-up menu does not appear, the selected word is not referenced. The yomi also appears in the pop-up menu.

To view the English reference information the user selects the English Reference from the pop-up menu and the information appears next to the pop-up menu.

To see the Note associated with the text, the user selects Notes from the pop-up menu and the Note appears in a separate window. If the Notes item is gray (for example, as shown in FIG. 3), no Note is available for the word. Notes also include a pop-up reference feature. The first word in the text with reference information has a black underbar beneath it. This is the Word Pointer, which indicates the most recent location for the pop-up menu and defaults to the first word. To see where a Note begins and ends, the user selects Show Note Guides from the View Menu.

The electronic viewer module also provides a Palette. To display the palette, the user selects Show Palette from the View Menu. The Word Display Palette displays all the reference information for quick viewing. The arrow buttons move the location of the Word Pointer and update the reference information. The See Note command displays the Note if one exists for the word and is gray if one is not present. The Add to PD command automatically copies the word and its associated information to the personal dictionary. If a Note is present, it is also copied to the personal dictionary.

A limited amount of text can be copied from the book by selecting Edit Mode from the View Menu, highlighting the desired text, and selecting Copy from the Edit Menu. Words can be searched for in the book by selecting Find from the Words Menu.

Using the Personal Dictionary Module

Figure 5:
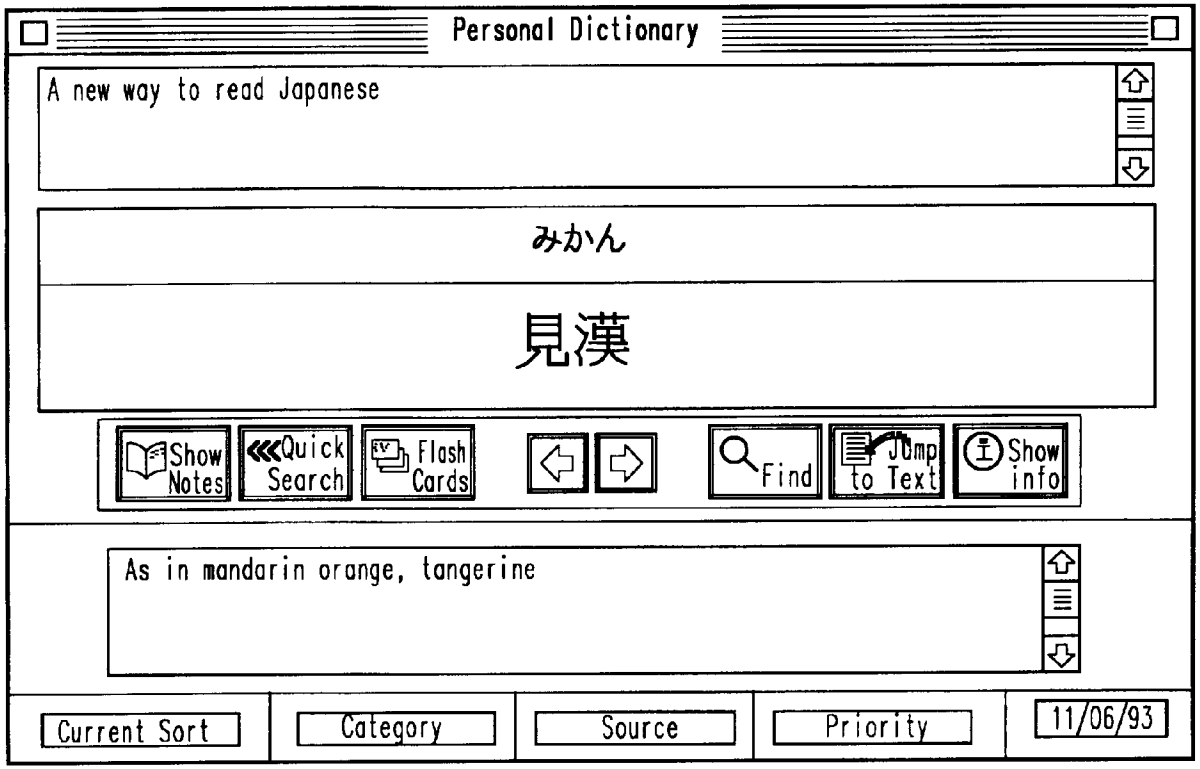
FIG. 5 is a screen display showing a Japanese word listed in a personal dictionary, as well as a word control palette, according to the invention.

FIG. 5 is a screen display showing a Japanese word listed in a personal dictionary, as well as a personal dictionary control panel, according to the invention. The personal dictionary module in the exemplary embodiment of the invention is implemented in a relational database that is optimized for managing and studying words. Unlike electronic dictionaries where only the word entries of the dictionary are searchable, the personal dictionary module allows a user to search on each of the eight or more keys associated with a word, as discussed above. To open the personal dictionary, the user selects Personal Dictionary from the File menu or double clicks on a Personal Dictionary icon.

The words contained in the personal dictionary are displayed in large fields with the word on the bottom, the yomi above the word, and the English reference on top, as shown in FIG. 5. In Browse Mode, clicking on a word alternately hides and shows the word. This function is used to enhance review and study of the Main Control Buttons. The Main Control Buttons are located just below the Word field. The arrow keys display the next or previous words based on the sort key indicated by the Sort Button in the bottom left corner. The Show Notes button displays the Note information about the Word. This button toggles to Hide Notes when the field is displayed and Show Notes when hidden. Additional notes and annotations can be entered directly. The Quick Search button displays the word in a pop-window for quick search of a single character. After the pop-up is displayed, the user can click on the desired character to search. The Flash Words button displays the words in the personal dictionary in slide show fashion. Sort order or random order are selectable: sort order uses the current sort order.

The Find button displays the search dialogue window. Words are searchable by the following keys: Word, Yomi, English Reference, Category, Source, Priority, or Date. The personal dictionary supports logical "AND" searching for each of the above keys. The following features are supported:

1. Jump to Text—this button jumps control and display from the personal dictionary to the source of the word in the original text;
2. Show Info—this button displays the Word Information Buttons, as well as the Date Indicator; this button toggles to Hide Info when displayed, and Show Info when hidden; and
3. Word Information—this button appears on the bottom of the screen and has the following functions:
   a. Current Sort—sets the sort order for the Dictionary to either Category, Source, Priority, or Date;
   b. Category—provides for a set of predefined Categories for words as well as the ability to add new Categories;
   c. Source—indicates the source of the Word: user entered words are indicated by the user name or if not available, by the default User;
   d. Priority—allows the user to assign a priority to a word from 1 to 5; and
   e. Date Display—the date is displayed in the bottom right hand corner; the date is automatically updated each time the word is displayed.

Searching

Both the electronic viewer module and the personal dictionary module provide search features accessible via the Word Menu. After selecting Find from the menu, the search dialogue appears.

The electronic viewer module includes a simple search feature that allows the user to search for a string of text anywhere in the book. The user enters the desired text and clicks Find to execute the Search. Find Next searches for the next occurrence of the word in the text.

In the personal dictionary, a slightly more complex search feature is provided. The search dialogue allows the user to enter multiple search terms. For example, a user can search for a certain term in the 'Economics' category or the user can look for a Kanji that has a certain reading. More search terms result in increased search time. The search term for Word, Yomi, Reference, Note, and Source are indexed based on the first seven characters contained in the field. Characters appearing after the seventh character in any of these fields are not found with the 'Starts With' selection. Selecting 'Contains' searches the entire text in the field.

To search, the user enters the desired word or character and then selects 'Starts With' or 'Contains' from the menu. A 'Starts With' search is the fastest. The 'Category' search terms are based on the category list. The integers 1 to 5 can be entered for 'Priority.' Date searching can be performed as 'is', 'is before', or 'is after.' After entering the desired search information, the user clicks 'Find' to execute the Search. Find Next searches for the next occurrence in the personal dictionary.

Importing/Exporting Word Lists

Text files can be read into the personal dictionary to make data exchange with other programs and colleagues feasible. The following format should be followed to allow accurate importing. One may use a spreadsheet program to build the word table and export the information as a tab delimited file. If a word processor is used, the user must add an extra tab for blank fields and follow the format listed below. In the exemplary embodiment of the invention, Export and Import uses the following format:

| | |
|---|---|
| Word | [TAB]; |
| Pronunciation | [TAB}; |
| Meaning | [TAB]; |
| Notes | [TAB]; |
| Category | [TAB]; |
| Source | [TAB]; |
| Priority | [TAB]; and |
| Date | [Hard Return]. |

Setting up the Word field as column A in a spreadsheet and then exporting as a text file results in this format. If a word processor is used, one should also save as a text file. One should not include any hard returns (user entered returns) within the string of text for the given word. If given the option, the user should elect to have soft returns (automatically entered returns) deleted. To import, the user selects Import Words from the File Menu, and then chooses the file for import. To export, the user selects Export Words from the File Menu, and then enters a name for the given file.

Although the invention is described herein with reference to the preferred embodiment, one skilled in the art will readily appreciate that other applications may be substituted for those set forth herein without departing from the spirit and scope of the present invention. For example, the invention may be used to index images such that elements of the image are linked to an external reference. Thus, an illustration of the human body may include descriptive external resources for each of the body's internal organs, and would thereby aid in the study of anatomy. Likewise, a video or other moving picture display, for example animated displays, could be indexed such that the picture could be stopped and various elements within a frame of the picture could be examined through links to external references. The invention allows such application because it does not embed information within the source material as is the case with prior art hyperlink technology. Rather, the invention creates a physical counterpart to the image in which a selected image position defines an offset that locates a desired external reference. Accordingly, the invention should only be limited by the claims included below.

We claim:

[1. A system for linking source material to reference material for display comprising:

a source material image including a plurality of discrete pieces having links to external reference materials comprising any of textual, audio, video, and picture information, said source material image stored in an electronic database;

means for determining an address on said electronic database for the beginning position of said source material image;

means for cutting said source material image into said discrete pieces;

means for determining an address on said electronic database for a start point and an end point of said discrete pieces of said image based upon said beginning position of said source material image;

means for recording said start and said end point addresses in a look-up table;

means for selecting a discrete portion of said source material image;

means for determining the address on said electronic database of said selected discrete portion;

means for converting said address of said selected discrete portion to an offset value from said beginning position address of said source material image;

means for comparing said offset value with said recorded start and end point addresses of said discrete pieces in said look-up table;

means for selecting an external reference that corresponds to said look-up table start and end point addresses; and means for reproducing said external reference.]

[2. The system of claim 1, further comprising:

a linking engine for linking said source material to said reference information on any of a word-by-word and phrase-by-phrase basis.]

[3. The system of claim 2, said linking engine further comprising:

word cut means for dividing said source material into discrete pieces;

linking means for establishing at least one link between each of said discrete pieces and said reference information;

compiler means for assembling an integrated source image from said discrete pieces;

indexing means for linking said assembled discrete pieces to said reference information.]

[4. The system of claim 3, said linking engine further comprising:

means for building an index to link each of said source material pieces to said reference information.]

[5. The system of claim 4, wherein said index links said source material pieces to said reference information based upon the value of the offset of the starting and ending position addresses of said source material pieces from the beginning position address of said integrated source image.]

[6. The system of claim 5, wherein said offset locates said reference information to a corresponding source material piece based upon offset occurrence within a range defined by the value of the offsets of the starting and ending point addresses of said source material pieces from said beginning position address of said integrated source image.]

[7. The system of claim 1, further comprising:

means for manipulating said stored source material and reference information with at least two user keys.]

[8. A method for linking source material to reference material for display, comprising:

determining the beginning position address of a source material image stored in an electronic database, said source material image including a plurality of discrete pieces having links to external reference materials comprising any of textual, audio, video, and picture information;

cutting said source material image into said discrete pieces;

determining a starting point address and an ending point address of said discrete pieces of said image based upon said beginning position address of said source material image;

recording said starting and said ending addresses in a look-up table;

selecting a discrete portion of said source material image;
determining the address of said selected discrete portion;
converting said address of said selected discrete portion to an offset value from said beginning position address of said source material image;
comparing said offset value with said recorded start and end point addresses of said discrete pieces in said look-up table;
selecting an external reference that corresponds to said look-up table start and end point addresses; and
reproducing said external reference.]

[9. In a language learning method, a method for linking source material to reference material for display, comprising the steps of:
reading a foreign language source material image including a plurality of discrete pieces having links to external reference materials comprising any of textual, audio, video, and picture information with an electronic viewer;
accessing reference materials on selected portions of said source material image;
determining the beginning position address of said source material image;
cutting said source material image into said discrete pieces;
determining a start point address and an end point address of said discrete pieces of said image based upon said beginning position address of said source material image;
recording said start and said end point addresses in a look-up table;
selecting a discrete portion of said source material image;
determining the address of said selected discrete portion;
converting said address of said selected discrete portion to an offset value from said beginning position address of said source material image;
comparing said offset value with said recorded start and end point addresses of said discrete pieces in said look-up table;
selecting an external reference that corresponds to said look-up table start and end point addresses; and
reproducing said external reference.]

[10. The method of claim 9, further comprising the step of:
linking said source material to said reference information with a linking engine on any of a word-by-word and phrase-by-phrase basis.]

[11. The method of claim 10, said linking step further comprising the steps of:
dividing said source material into discrete pieces;
establishing at least one link between each of said discrete pieces and said reference information;
assembling an integrated source image from said discrete pieces; and
linking said assembled discrete pieces to said reference information.]

[12. The method of claim 11, said linking step further comprising the step of:
building an index to link each of said source material pieces to said reference information.]

[13. The method of claim 12, wherein said index links said source material pieces to said reference information based upon the offset between the starting position address for said source material pieces and the beginning position address of said integrated source image.]

[14. The method of claim 13, wherein said offset locates said reference information to a corresponding source material piece based upon offset occurrence within a range defined by the value of the offsets of the starting and ending position addresses of said source material pieces from said beginning position address of said integrated source image.]

[15. In a language learning system, a system for linking source material to reference material for display, comprising:
a text image including a plurality of discrete pieces having links to external reference materials comprising any of textual, audio, video, and picture information;
means for determining the beginning position address of said text image;
means for cutting said text image into said discrete pieces;
means for determining a starting point address and an ending point address of said discrete pieces of said image based upon said beginning position address of said source material image;
means for recording said starting and said ending point addresses in a look-up table;
means for selecting a discrete portion of said text image;
means for determining the address of said selected discrete portion;
means for converting said address of said selected discrete portion to an offset value from said beginning position address of said source material image;
means for comparing said offset value with said recorded start and end point addresses of said discrete pieces in said look-up table;
means for selecting an external reference that corresponds to said look-up table start and end point addresses; and
means for displaying said external reference.]

[16. In a language learning method, a method for linking source material to reference material for display, comprising the steps of:
determining the beginning position address of a text image, said text image including a plurality of discrete pieces having links to external reference materials comprising any of textual, audio, video, and picture information;
cutting said source material image into said discrete pieces;
determining a starting point address and an ending point address of said discrete pieces of said image based upon said beginning position address of said text image;
recording said starting and said ending point addresses in a look-up table;
selecting a discrete portion of said text image;
determining the address of said selected discrete portion;
converting said address of said selected discrete portion to an offset value from said beginning position of said text image;
comparing said offset value with said recorded start and end point addresses of said discrete pieces in said look-up table;
selecting an external reference that corresponds to said look-up table start and end point address; and
displaying said external reference.]

*17. A method for linking source material to external reference materials for display, the method comprising the steps of:*
*determining a beginning position address of a source material stored in an electronic database;*
*cutting the source material into a plurality of discrete pieces;*
*determining a starting point address and an ending point address of at least one of the plurality of discrete pieces based upon the beginning position address;*
*recording in a look up table the starting and ending point addresses;*
*linking at least one of the plurality of discrete pieces to at least one of a plurality of external reference materials,*

*the plurality of external reference materials comprising any of textual, audio, video, and picture information;*

*selecting a discrete portion of an image of the source material;*

*determining a display address of the selected discrete portion of the source material image;*

*converting the display address of the selected discrete portion to an offset value from the beginning position address;*

*comparing the offset value with the starting and ending point addresses recorded in the look-up table to identify one of the plurality of discrete pieces;*

*selecting one of the plurality of external reference materials corresponding to the identified one of the plurality of discrete pieces; and*

*displaying the selected one of the plurality of external reference materials.*

*18. The method of claim 17, wherein cutting the source material into a plurality of discrete pieces is done manually.*

*19. The method of claim 17, wherein cutting the source material into a plurality of discrete pieces is done automatically.*

*20. The method of claim 19, wherein automatically cutting the source material into a plurality of discrete pieces is done using a grammar parser.*

*21. The method of claim 19, wherein automatically cutting the source material into a plurality of discrete pieces is done without using tags.*

*22. The method of claim 19, wherein automatically cutting the source material into a plurality of discrete pieces is done without reference to any tags which may be located in the source material.*

*23. The method of claim 17, wherein the link is a hyperlink.*

*24. The method of claim 17, wherein the link is an address of the selected one of the plurality of external reference materials.*

*25. The method of claim 17, wherein the link is reference information for retrieving the selected one of the plurality of external reference materials.*

*26. The method of claim 17, wherein the source material is text based source material.*

*27. The method of claim 17, wherein the source material is image based source material.*

*28. The method of claim 17, wherein the source material is graphic based source material.*

*29. The method of claim 17, wherein the source material is audio based source material.*

*30. The method of claim 17, wherein the source material is video based source material.*

*31. The method of claim 17, wherein the source material is a combination of two or more of text based source material, image based source material, graphic based source material, audio based source material, and video based source material.*

*32. The method of claim 17, wherein linking at least one of the plurality of discrete pieces is done manually.*

*33. The method of claim 17, wherein linking at least one of the plurality of discrete pieces is done automatically.*

*34. A system for linking source material to external reference materials for display, the system comprising:*

*means for determining a beginning position address of a source material stored in an electronic database;*

*means for cutting the source material into a plurality of discrete pieces;*

*means for determining a starting point address and an ending point address of at least one of the plurality of discrete pieces based upon the beginning position address;*

*means for recording in a look up table the starting and ending point addresses;*

*means for linking at least one of the plurality of discrete pieces to at least one of a plurality of external reference materials, the plurality of external reference materials comprising any of textual, audio, video, and picture information;*

*means for selecting a discrete portion of an image of the source material;*

*means for determining a display address of the selected discrete portion of the source material image;*

*means for converting the display address of the selected discrete portion to an offset value from the beginning position address;*

*means for comparing the offset value with the starting and ending point addresses recorded in the look-up table to identify one of the plurality of discrete pieces;*

*means for selecting one of the plurality of external reference materials corresponding to the identified one of the plurality of discrete pieces; and*

*means for displaying the selected one of the plurality of external reference materials.*

*35. A method for linking textual source material to external reference materials for display, the method comprising the steps of:*

*determining a beginning position address of textual source material stored in an electronic database;*

*cutting the textual source material into a plurality of discrete pieces;*

*determining a starting point address and an ending point address of at least one of the plurality of discrete pieces based upon the beginning position address;*

*recording in a look up table the starting and ending point addresses;*

*linking at least one of the plurality of discrete pieces to at least one of a plurality of external reference materials, the plurality of external reference materials comprising any of textual, audio, video, and picture information;*

*selecting a discrete portion of an image of the textual source material;*

*determining a display address of the selected discrete portion of the textual source material image;*

*converting the display address of the selected discrete portion to an offset value from the beginning position address;*

*comparing the offset value with the starting and ending point addresses recorded in the look-up table to identify one of the plurality of discrete pieces;*

*selecting one of the plurality of external reference materials corresponding to the identified one of the plurality of discrete pieces; and*

*displaying the selected one of the plurality of external reference materials.*

* * * * *